United States Patent [19]
Bell

[11] 3,892,243
[45] July 1, 1975

[54] METHOD OF MAKING A BABY PACIFIER

[75] Inventor: Harold E. Bell, Decatur, Ga.

[73] Assignee: The Raymond Lee Organization, Inc., New York, N.Y. ; a part interest

[22] Filed: June 21, 1974

[21] Appl. No.: 481,682

[52] U.S. Cl. .............................................. 128/359
[51] Int. Cl. ............................................ A61j 17/00
[58] Field of Search ................................... 128/359

[56] References Cited
UNITED STATES PATENTS

| | | | |
|---|---|---|---|
| 2,514,844 | 7/1950 | Cohen | 128/359 |
| 2,604,404 | 7/1952 | Genjack | 128/359 X |
| 2,826,201 | 3/1958 | Yoder | 128/359 |

FOREIGN PATENTS OR APPLICATIONS

| | | | |
|---|---|---|---|
| 1,118,738 | 7/1968 | United Kingdom | 128/359 |

*Primary Examiner*—Aldrich F. Medbery
*Attorney, Agent, or Firm*—Daniel Jay Tick

[57] ABSTRACT

A method of making a baby pacifier comprises the steps of impregnating gauze with margarine or butter. Honey or sugar is applied to the impregnated gauze. The gauze is then affixed to a ring supported by a handle.

2 Claims, 3 Drawing Figures

5 HANDLE

3 — HONEY OR SUGAR

2 — BUTTER OR MARGARINE

GAUZE 6

METHOD OF MAKING A BABY PACIFIER

DESCRIPTION OF THE INVENTION

The present invention relates to a method of making a baby pacifier, and a baby pacifier.

Objects of the invention are to provide a baby pacifier and a method of making a baby pacifier, which pacifier is of simple structure, inexpensive in manufacture, and efficient, effective and reliable in pacifying an infant, and which method is simple, inexpensive, rapid and convenient in execution.

In order that the invention may be readily carried into effect, it will now be described with reference to the accompanying drawing, wherein.

Figure 3:
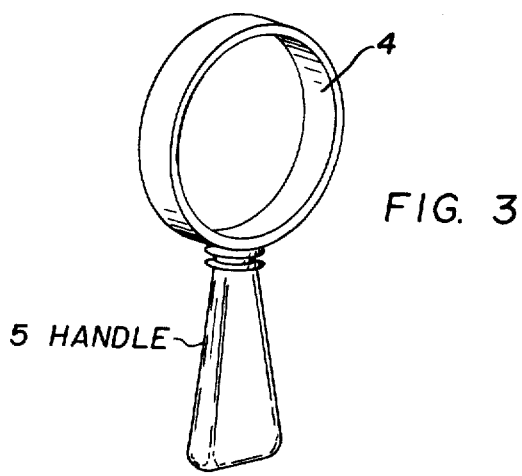
FIG. 3 is a perspective view of an embodiment of the handle and ring portion of the baby pacifier of the invention.
Figure 1:
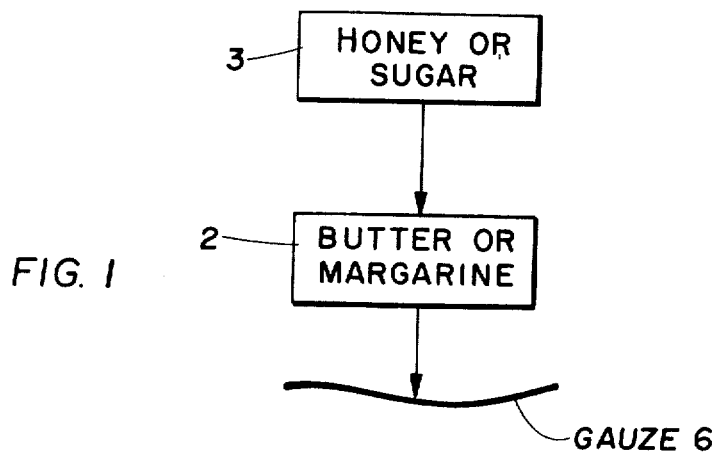
FIG. 1 is a block diagram of the first two steps of the method of making a baby pacifier of the invention.

The method of the invention of making a baby pacifier comprises the steps of impregnating gauze 6 with margarine or butter 2 and applying honey or sugar 3 to the impregnated gauze, as shown in FIG. 1. The gauze 6 is then applied to a ring portion 4 (FIG. 3).

Figure 2:
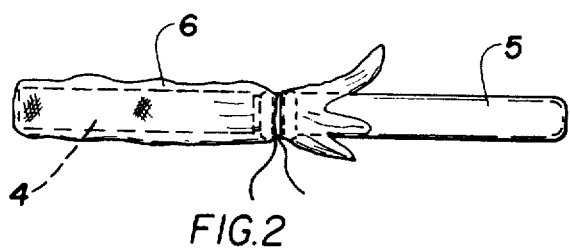
FIG. 2 is a side view of an embodiment of the baby pacifier of the invention as assembled.

As shown in FIG. 2, the baby pacifier of the invention comprises a handle 5 and gauze 6 affixed to the handle. Margarine or butter is provided to impregnate the gauze 6 and honey or sugar is applied on the surface of the impregnated gauze.

While the invention has been described by means of specific examples and in specific embodiments, I do not wish to be limited thereto, for obvious modifications will occur to those skilled in the art without departing from the spirit and scope of the invention.

I claim:

1. A method of making a baby pacifier, comprising the steps of impregnating gauze with one of the group consisting of margarine and butter;

applying one of the group consisting of honey and sugar to the impregnated gauze; and affixing the impregnated gauze to a handle supported ring portion.

2. A baby pacifier, comprising a handle and a ring held thereby;

gauze affixed to the ring;

one of the group consisting of margarine and butter impregnated in the gauze; and one of the group consisting of honey and sugar on the surface of the impregnated portion of the gauze.

* * * * *